United States Patent
Glasser et al.

(10) Patent No.: US 9,826,182 B2
(45) Date of Patent: Nov. 21, 2017

(54) METHOD FOR DETERMINING AND CORRECTING THE STABILITY OF RESPONSE OF A SEMI-CONDUCTOR MATRIX DETECTOR

(75) Inventors: Francis Glasser, Eybens (FR); Loïck Verger, Grenoble (FR)

(73) Assignee: COMMISARIAT A L'ENERGIE ATOMIQUE ET AUX ENEGIES ALTERNATIVES, Paris (FR)

( * ) Notice: Subject to any disclaimer, the term of this patent is extended or adjusted under 35 U.S.C. 154(b) by 395 days.

(21) Appl. No.: 13/245,654

(22) Filed: Sep. 26, 2011

(65) Prior Publication Data
US 2012/0074304 A1    Mar. 29, 2012

(30) Foreign Application Priority Data

Sep. 27, 2010    (FR) ...................................... 10 57769

(51) Int. Cl.
*G01D 18/00*    (2006.01)
*H04N 5/365*    (2011.01)
*H04N 5/367*    (2011.01)
*H04N 5/32*    (2006.01)
*G01T 7/00*    (2006.01)

(52) U.S. Cl.
CPC ........... *H04N 5/3651* (2013.01); *G01T 7/005* (2013.01); *H04N 5/32* (2013.01); *H04N 5/367* (2013.01)

(58) Field of Classification Search
USPC ....................................................... 250/252.1
See application file for complete search history.

(56) References Cited

U.S. PATENT DOCUMENTS

| 8,491,190 B2 | 7/2013 | Glasser et al. |
| 2006/0011853 A1* | 1/2006 | Spartiotis et al. ....... 250/370.13 |
| 2009/0167907 A1* | 7/2009 | Utsugi .......................... 348/246 |
| 2011/0091017 A1* | 4/2011 | Friedlander et al. ......... 378/146 |

FOREIGN PATENT DOCUMENTS

| EP | 1006719 A1 | 6/2000 |
| EP | 1795918 A2 | 6/2007 |
| WO | 2011/067251 A1 | 6/2011 |

OTHER PUBLICATIONS

Arodzero A. et al.: "A System for the Characterization and Testing of CdZnTe/CdTe Pixel Detectors for X-ray and Gamma-ray Imaging," Nuclear Science Symposium Conference Record, 2006. IEEE, Piscataway, NJ, USA, Oct. 29, 2006, pp. 3638-3642.

(Continued)

*Primary Examiner* — David Porta
*Assistant Examiner* — Shun Lee
(74) *Attorney, Agent, or Firm* — Baker & Hostetler LLP

(57) ABSTRACT

Techniques for controlling a stability of response of a semi-conductor matrix imager composed of pixels, including a first phase of characterizing the stability of the pixels and a second phase of correcting the signals arising from the pixels during the measurements. The pixels are classed into stable pixels and unstable pixels according to a predetermined criterion, the unstable pixels being associated individually with a stable pixel whose characteristics serve as base for correcting signals arising from the unstable pixels.

12 Claims, 3 Drawing Sheets

(56) References Cited

OTHER PUBLICATIONS

Uwe Hampel et al.: "Application of CdTe and CZT detectors in Ultra Fast Electron Beam X-Ray Tomography," Nuclear Science Symposium Conference Record, 2008. NSS '08. IEEE Oct. 19-25, 2008, IEEE, Piscataway, NJ, USA, Oct. 19, 2008, pp. 96-99.
Bogdanovich S. et al.: "Temporal Response of CZT Detectors Under Intense Irradiation," IEEE Transactions on Nuclear Science, IEEE Service Center, New York, NY, US, vol. 50, No. 4, Aug. 1, 2003, pp. 1031-1035.

* cited by examiner

METHOD FOR DETERMINING AND CORRECTING THE STABILITY OF RESPONSE OF A SEMI-CONDUCTOR MATRIX DETECTOR

CROSS-REFERENCE TO RELATED APPLICATIONS

This application claims priority to foreign French patent application No. FR 10 57769, filed on Sep. 27, 2010, the disclosure of which is incorporated by reference in its entirety.

FIELD OF THE INVENTION

The field of the invention is that of imagers of semi-conducting type and more particularly that of X-ray or gamma radiation imagers.

BACKGROUND OF THE INVENTION

An imager of semi-conducting type is represented in FIG. 1. It comprises, generally, a detector material M, a first face of which comprises a large number of pixels P, possibly between a few thousand and a few million, generally disposed in matrix form and a second face comprising a large electrode E making it possible to polarize the detector. When the detector is irradiated by a radiation R generally of very low wavelength, each pixel P measures a signal S representing the energy yielded in the detector material by the interactions between the radiation and the detector material that have taken place in a zone of the detector facing this pixel.

In such detectors, the response of the pixels is not homogeneous. Stated otherwise, two pixels of the same detector subjected to identical radiation may produce two signals of different amplitude. One also speaks of spatial heterogeneity of response. This heterogeneity has several causes. Mention will be made notably of spatially variable detection characteristics of the detector material, it being possible for pixels to have differences in sensitivity with respect to one another. When this heterogeneity is stable over time, it is customarily corrected either by a simple gain correction and offset correction, or by a more complicated function of polynomial type.

A second significant cause of heterogeneity may be temporal instability or drift of the response of the detectors. The origin of this type of drift can stem from a strong irradiation which, through the appearance of a space charge, locally modifies the internal electric field of the material. Thus, the more the detectors are subjected to a significant quantity of integrated radiation, the more the spatial heterogeneity of response changes, doing so in a manner which is dependent on the irradiation history.

Moreover, in the course of one and the same acquisition, the sensitivity of the pixel, that is to say the signal delivered as a function of the incident radiation flux, can vary. There thus exist stable pixels whose sensitivity does not change with time and unstable pixels whose sensitivity changes with time. By way of example, FIG. 2 represents the temporal changes over a duration of several hundred seconds of the amplitude $I_S$ of the signal S of a pixel, measured as a number of impacts NI recorded during a given time period, or counting period or acquisition time. In the case of FIG. 2, the acquisition time equals 0.2 seconds, and the detector is irradiated for a duration of about 180 seconds. Each point of the curve corresponds to the number of strikes detected by the detector during a period of 2 ms. The number of strikes, or interactions detected, equals about 19400 at the start of irradiation, that is to say with a time t of close to 0 seconds, and decreases slowly with the irradiation time. After 3 minutes of irradiation, the number of strikes then equals fewer than 19000. This figure was obtained by exposing a pixel of CdTe, with dimensions 200 µm*200 µm and thickness 1.5 mm, with a beam of X rays, delivering a fluence rate, at the detector level, of $3 \times 10^8$ photons/s·mm². This phenomenon is due to the appearance of space charge zones in a detector subjected to irradiation. These space charge zones lower the electric polarization field, the effect of which is a lowering of the sensitivity, hence a lesser number of interactions detected. It is a progressive phenomenon, giving rise to a spatially and temporally fluctuating polarization of the detector.

Consequently, the sensitivity of a matrix detector varies both spatially and temporally. Thus, the spatial heterogeneity of the response changes in the course of one and the same acquisition, and this phenomenon is also hard to predict. No solutions currently exist which make it possible to solve this problem in a satisfactory manner except by removing the trap levels responsible for the appearance of the space charge in the semi-conducting material. This makes it possible to minimize the problem, but zones of greater or lesser stability still remain. This problem is significant in so far as, in certain applications such as X-ray tomography, the stability criterion is paramount for avoiding artifacts in the images.

SUMMARY OF THE INVENTION

The method according to the invention makes it possible to eliminate or to limit in large part these drawbacks. The invention is a method for determining the stability of response of the detector. Stated otherwise, the method according to the invention makes it possible to map the variations in response of a pixelated matrix detector over time. This method makes it possible notably to identify the pixels whose response is particularly stable with time, termed "stable pixels" or "reference pixels" and those which are not, termed "unstable pixels". The method also allows the correction of the stability of response of the detector in the course of an exposure.

The invention also relates to a detection device exhibiting means making it possible to implement this method for determining and correcting the instability of response.

More precisely, the subject of the invention is a method of controlling the stability of response of a semi-conductor matrix imager composed of pixels, the said method comprising at least one first phase of characterizing the said stability, characterized in that the said first phase comprises the following steps:

Irradiation of the pixels of the detector by a gauge radiation that is constant over time for a predetermined duration;

Storage of the signals delivered by each pixel at regular time intervals for the said predetermined duration;

Determination, for each pixel, of an amplitude distribution of the signals delivered by each pixel;

Characterization of each distribution by at least one statistical indicator representative of the dispersion of the said distribution;

Classifying each pixel, on the basis of this indicator, into at least two categories of pixels, each category being representative of the stability of the temporal response of the pixels, the pixels belonging to the first category being denoted "stable pixels", the pixels belonging to the second category being denoted "unstable pixels".

Advantageously, the said method comprises at least one second phase of correcting the said stability comprising the following steps:

Association of each unstable pixel with at least one stable pixel according to a predetermined criterion;

Irradiation of the pixels of the detector by a radiation to be characterized;

Storage of the signals delivered by each pixel for at least one time interval taken during the said predetermined duration;

Correction of the signal or signals generated by each unstable pixel as a function of the signal or signals generated by the stable pixel with which the said unstable pixel is associated.

Advantageously, the amplitude distribution of each pixel n is a histogram $D_n$ centered on a mean value $\mu_n$, the statistical indicator being a standard deviation $s_n$.

Advantageously, the classing/classifying of a pixel into a category of pixels is carried out depending on whether the value of the ratio $s_n/\mu_n$ is below a predetermined threshold.

Advantageously, the matrix is decomposed into elementary mesh cells comprising a predetermined number of pixels, the pixel of the said mesh cell having the lowest value of the ratio $s_n/\mu_n$ belonging to the first category of pixels, the other pixels of the mesh cell belonging to the second category of pixels.

Advantageously, the predetermined criterion is either the smallest distance separating the unstable pixel from the closest stable pixel, or membership in one and the same mesh cell.

Advantageously, the correction of the signal generated by each unstable pixel is effected by multiplying the said signal of the said unstable pixel by a constant coefficient proportional to the signal delivered by the stable pixel with which the said unstable pixel is associated. It may also be effected, during a given time interval, by multiplying the said signal of the said unstable pixel by a coefficient proportional to the mean value of the signal delivered by the stable pixel with which the said unstable pixel is associated during the same time interval.

The invention also relates to a matrix imager implementing the above method. This imager then comprises a semi-conducting active detection surface composed of pixels, comprising means for storing and processing the signals arising from the pixels of the active surface, characterized in that the pixels are distributed into at least two categories, the first category comprising so-called stable pixels, the second category comprising so-called unstable pixels, each unstable pixel being tied to a stable pixel according to a predetermined criterion, the signals arising from each unstable pixel being transmitted with at least one correction coefficient dependent on the signal of the stable pixel with which the unstable pixel is associated.

BRIEF DESCRIPTION OF THE DRAWINGS

The invention will be better understood and other advantages will become apparent on reading the nonlimiting description which follows and by virtue of the appended figures among which.

DETAILED DESCRIPTION

The method of controlling the stability of response of a semi-conductor matrix imager composed of pixels comprises two distinct phases: a first phase of characterizing the stability of the pixels and a second phase of correcting the signals of the pixels so as to obtain correct measurements at the output of the imager.

In a preferential manner, the detector material of the imager is a semi-conductor, made for example with the aid of a material of type CdZnTe or CdTe, other types of semi-conducting materials known to the person skilled in the art being usable. The semi-conducting material is of parallelepipedal shape. The thickness of the material is between a few hundred microns and a few millimeters. The area of its surface varies depending on the application and generally equals a few $cm^2$. Naturally, the invention also applies to other pixelated radiation detectors, and in particular to those based on a scintillator material coupled to a matrix of photo-detectors.

A first face of this detector consists of pixels arranged according to a matrix. The word pixel is understood to mean an electrode deposited on the material and polarized so as to collect charge carriers, in this instance electrons, this electrode being hooked up to signal processing means. Each electrode of this first face, or anode, is linked to means for processing the signal collected, means known to the person skilled in the art, in such a way that the amplitude of the signal detected by the electrode depends on the energy deposited in the detector by the incident radiation.

A second face of this detector consists of one or more electrodes, the cathodes, polarized to a lower potential than that of the anodes.

Thus, the detection device comprises:
the detector block comprising the detector material and the various electrodes;
means for polarizing the various anodes and cathodes of the detector;
means for processing the signal delivered by each anode.

Figure 1:
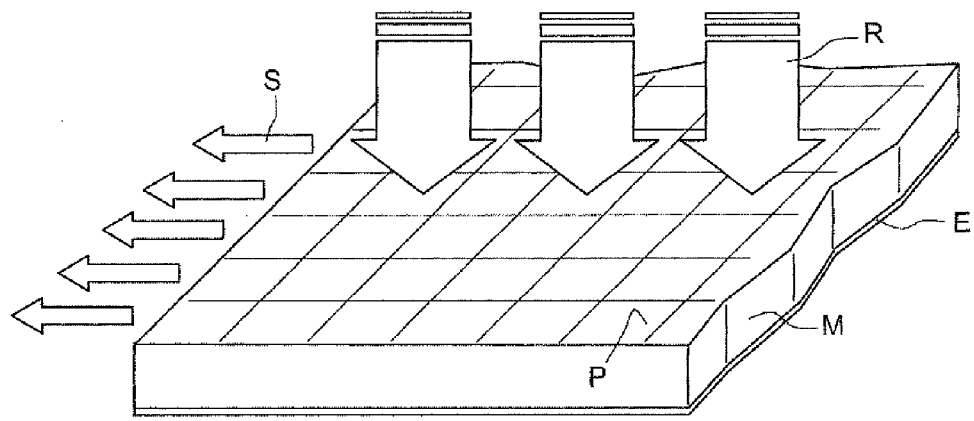
FIG. 1, already commented on, represents the operating principle of a matrix imager.
Figure 2:
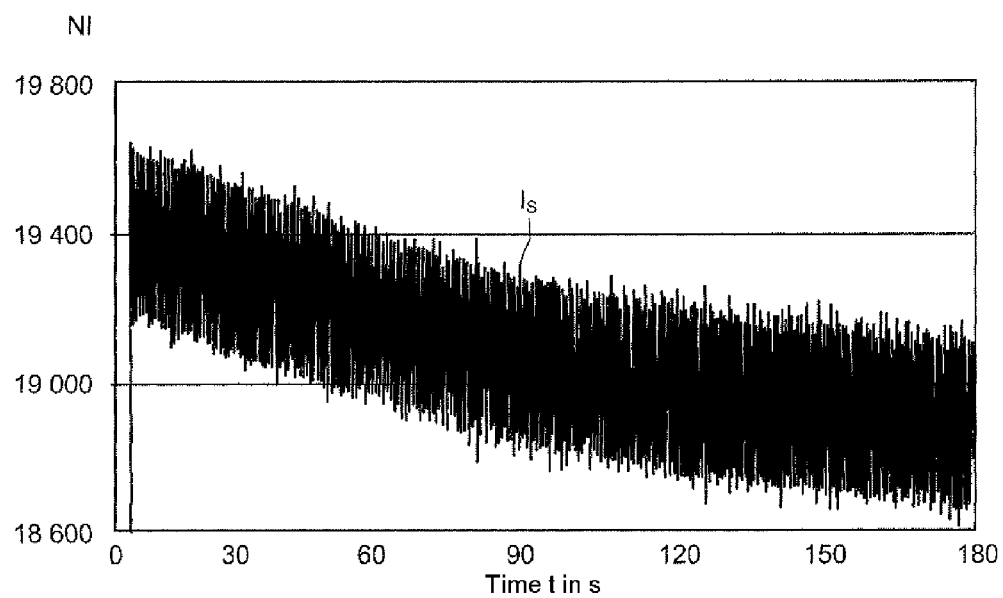
FIG. 2, also commented on, represents the variations over time of an output signal of a pixel of a matrix imager.
Figure 3:
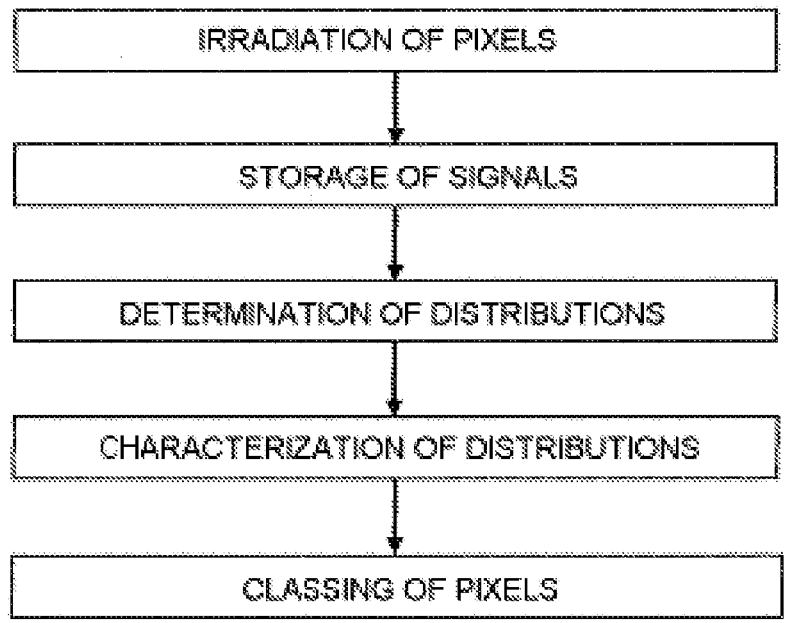
FIG. 3 represents the main steps of the first phase of the method of controlling the stability of response of a matrix imager according to the invention.

The steps of the first phase of the method according to the invention are represented in FIG. 3 and detailed herein below.

In a first step, the detector is subjected to a radiation that is constant over time and preferably homogeneous. The detector is irradiated in such a way that each pixel is subjected to an incident photon flux which is constant during this irradiation period, and preferably spatially homogeneous. The expression photon flux is understood to mean X-ray or gamma radiation, preferably X-ray radiation. The radiation source can then be an X-ray generator such as used for example in a medical scanner whose power characteristics are a voltage of 120 kV and a current of 100 mA. The expression substantially homogeneous is understood to mean a radiation producing a fluence rate, that is to say a number of photons per unit area and time, which is constant to within a few percent on the second face of the detector. The fluence rate is chosen high enough so that instabilities in the response of the various pixels may appear. By way of example, the flux may be of the order of $10^9$ photons/s·mm².

During irradiation, the pixels of the detector generate signals, at regular time intervals, and it is possible to obtain, for each pixel, the amplitude variation of the signal detected as a function of time. In a second step, these signals are stored for the whole set of pixels. The successive measurements may be undertaken according to a sliding average. They generally last for a duration of between a second and a few minutes. The sampling frequency, defining the time interval separating two successive signals produced by one and the same pixel, is a few hundred microseconds.

Figure 4:
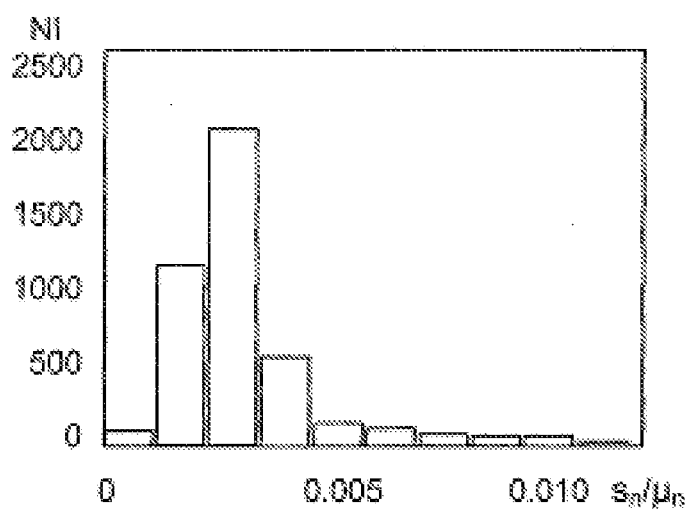
FIG. 4 represents an exemplary amplitude distribution of the signals delivered by a pixel for one and the same signal in the course of time.

Thus, each pixel produces successive signals, of variable amplitude, in the course of the period of irradiation under constant flux. It is then possible, in a third step, to determine, for each pixel n, an amplitude distribution $D_n$, in the form of a histogram, representing the number of occurrences of signals as a function of amplitude. This distribution takes the form of a spike, centered on a mean value $\mu_n$, of which it is possible to extract a statistical indicator, for example a standard deviation $s_n$, the latter corresponding to the mid-height width divided by 2.35 in the case where the distribution follows a Gaussian probability law. FIG. 4 represents such a histogram in which the number of occurrences NI is represented as a function of the ratio $s_n/\mu_n$.

In a fourth step, each distribution is characterized by an indicator representative of the temporal stability of the response of the pixel. It is possible to take as indicator, for example, the mid-height width of the histogram.

Finally, in a fifth step, each pixel n is categorized as a function of the value taken by the preceding indicator. The expression temporal stability of response is understood to mean the variation in the amplitude of the signals produced by this pixel when it is exposed to a constant radiation. For example a pixel is considered to be stable if $s_n/\mu_n$ is below a threshold value (for example: 0.005). If $s_n/\mu_n$ is above this threshold, the pixel is considered to be unstable.

It is possible, of course, to envisage a larger number of categories so as for example to eliminate the pixels that are very unstable or have an aberrant response. It is also possible to determine, over a given group of pixels, the one which is "the most stable", as a function of the value taken by this indicator. This most stable pixel is considered to be a stable pixel.

Figure 5:
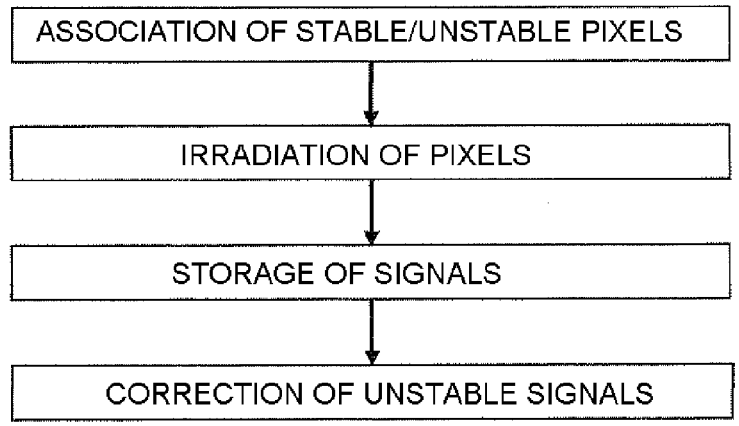
FIG. 5 represents the main steps of the second phase of the method of controlling the stability of response of a matrix imager according to the invention.

This categorization of the pixels having been carried out, it is possible to proceed to the steps of the second phase of the method according to the invention. These steps are represented in FIG. 5 and detailed herein below.

In a first step, each unstable pixel of the detector is tied to a stable pixel that may also be called a reference pixel. The word "tied" is understood to mean an imaginary link, based for example on a criterion of relative position and on the previously determined stability indicator.

Figure 6:
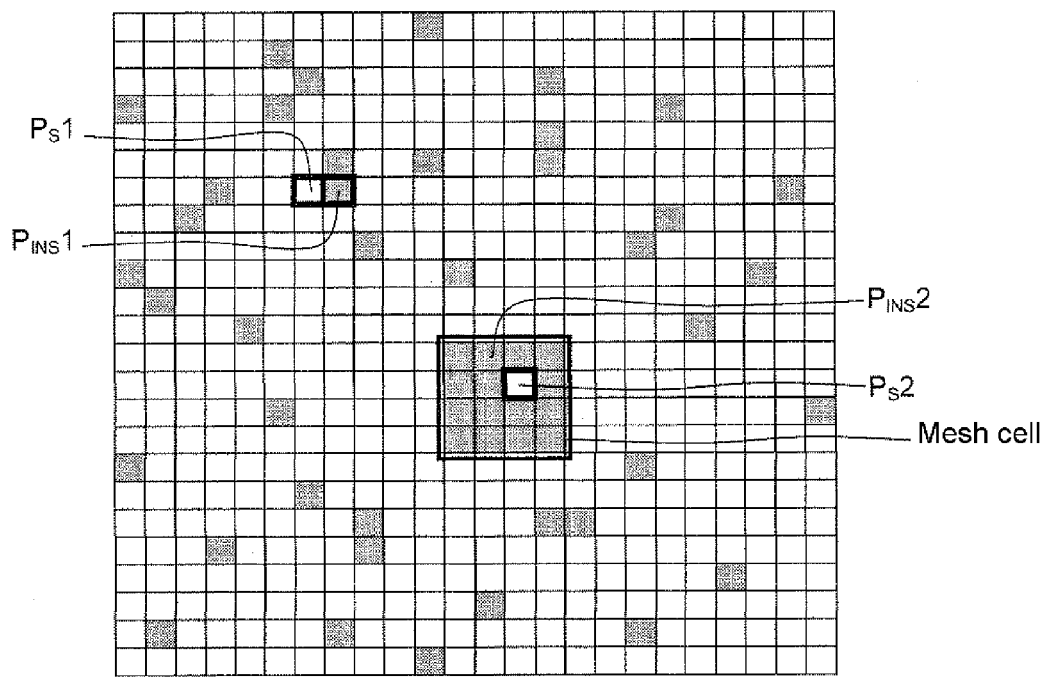
FIG. 6 represents two examples of associating an unstable pixel with a stable pixel.

By way of first example illustrated in FIG. 6 and representing the pixels of a detection matrix, each unstable pixel $P_{INS}1$ is linked to the geographically closest stable pixel $P_S1$.

By way of second example also in FIG. 6, the matrix of pixels can also be divided virtually into mesh cells, each mesh cell grouping together a predetermined number of pixels. In this case, in each mesh cell, the most stable pixel $P_S2$ is determined and is thereafter considered to be the stable pixel of the mesh cell, to which the other pixels $P_{INS}2$ of the same mesh cell, which are then considered to be unstable, are tied. Each mesh cell may be a quadrilateral, advantageously square, then comprising $p^2$ pixels. The mesh cells are generally of small dimension comprising at the very most 25 pixels per mesh cell. In FIG. 6, the mesh cell is a square of 16 pixels therefore comprising a "stable" pixel and 15 so-called "unstable" pixels.

When this mesh has been produced, the detection device is ready to be used under measurement conditions, that is to say exposed to an unknown incident radiation. In a second step, the detector is therefore irradiated with the radiation to be measured for a second predetermined duration. This second duration is not necessarily equal to the first predetermined duration, necessary for the calibration of the pixels and for the determination of the stable pixels and unstable pixels.

In a third step, the amplitude of the signal delivered by each pixel over time is determined. Generally, the storage of the signals delivered by each pixel is performed for several time intervals taken during the said second predetermined duration.

Finally, in a fourth step, the signal generated by each unstable pixel is corrected as a function of the signal generated by the stable pixel to which the said unstable pixel is tied. Preferably, the correction is carried out by multiplying the signal generated by an unstable pixel by a correction factor combining temporal averages of signals respectively generated by the unstable pixel and the stable pixel to which the unstable pixel is tied.

In what follows, $S_{unstable}(t)$ will denote the signal arising from an unstable pixel before correction, $S^*_{unstable}(t)$ the signal arising from an unstable pixel after correction and $S_{stable}(t)$ the signal arising from the associated stable pixel, t representing time. Also, k will denote the correction factor such that:

$$S^*_{unstable}(t)=k*S_{unstable}(t)$$

By way of first exemplary correction, the signal $S_{unstable}(t)$ can simply be substituted with the associated signal $S_{stable}(t)$. We have in this case:

$$S^*_{unstable}(t)=S_{stable}(t)$$

In this case, k equals $S_{stable}(t)/S_{unstable}(t)$

By way of second example, it is possible to correct the variations of the unstable signal $S_{unstable}(t)$ as a function of time by substituting the variations of the stable signal for those of the unstable signal. We then have:

$$S^*_{unstable}(t)=S_{unstable}(t0)*(S_{stable}(t)/S_{stable}(t0))$$

t0 being, for example, the initial instant at which the measurements began.

By way of third example, sliding averages of signals may be used as correction source, these averages being computed over a time interval $\Delta t$ which may be from a few hundred milliseconds to a few seconds. These averages are denoted $M_{stable}(t)$ for the stable signals and $M_{unstable}(t)$ for the unstable signals. We have the relations:

$$M_{stable}(t)=\int_t^{t+\Delta t}S_{stable}(t)/\Delta t$$

and $$M_{unstable}(t)=\int_t^{t+\Delta 6}S_{unstable}(t)/\Delta t$$

In this case, the signal S (t) of each unstable pixel is corrected in the following manner:

$$S^*_{unstable}(t)=S_{unstable}(t)*M_{stable}(t)/M_{unstable}(t)$$

Thus, each signal arising from each unstable pixel is assigned a correction factor k dependent on the position of the unstable pixel in the detector and varying with time. It is therefore a changeable correction factor, that is to say one which varies in the course of one and the same exposure of the detector, this constituting a particularly advantageous point. Moreover, this correction factor depends on the stable pixel situated in proximity to the unstable pixel. Stated otherwise, this indicator is spatialized. This stable pixel or reference pixel having been subjected to the same irradiation history, such a correction factor is particularly appropriate.

This correction is all the more effective, the more significant the pixilation of the detector in relation to the spatial resolution of the system. In this case, two pixels that are close together see physically the same incident radiation. This significant pixilation may be justified moreover for measuring high fluxes, as is the case with X-ray scanners. The number of incident photons is divided by a multitude of pixels, thereby reducing the maximum flux to be measured for each electron pathway.

The correction of the signal of each unstable pixel is particularly effective at the start of irradiation. Indeed, when the irradiation period lasts too long, for example beyond a few tens of minutes, non-linear effects may appear, rendering a correction more random. It is then useful to depolarize the detector, and then to repolarize it before undertaking a new irradiation of the detector.

It is known that the loss of sensitivity affecting each pixel in the course of irradiation may be, as it were, cancelled, by depolarizing the semi-conducting material. Thus, after a depolarization-polarization cycle, each pixel regains the sensitivity that it had after the previous cycle. Stated otherwise, the sensitivity of each pixel, after a depolarization-polarization cycle, and before any irradiation, hardly changes at all. It may then be advantageous, after one or more irradiation periods, to undertake a depolarization and then a repolarization. The corrections described previously are then rendered more effective.

We claim:

1. A method of controlling a stability of response of a semi-conductor matrix imager comprising a plurality of pixels, the method comprising:
   a first phase of characterizing the stability of pixels, the first phase comprising:
   irradiating the pixels of a detector with a gauge radiation that is constant over time for a first predetermined duration;
   storing signals delivered by each pixel at regular time intervals for the first predetermined duration;
   determining, for each pixel, an amplitude distribution of the signals delivered by each pixel wherein the amplitude distribution of each pixel is a histogram, including the number of occurrences of signals as a function of amplitude;
   characterizing each distribution with a statistical indicator representative of a dispersion of the distribution; and
   classifying each pixel, on the basis the indicator for the pixel, into one of at least two categories of pixels, each category being representative of the stability of the temporal response of the pixels, the first category representing stable pixels, and the second category representing unstable pixels; and
   a second phase of correcting the stability of unstable pixels, the second phase comprising:
   associating each unstable pixel with a stable pixel according to a criterion of relative position;
   irradiating the pixels with a radiation to be characterized for a second predetermined duration;
   storing signals delivered by each pixel for at least one time interval during the said second predetermined duration; and
   correcting the signal generated by each unstable pixel by multiplying the signal of the associated stable pixel by a ratio between the signal of said unstable pixel at an initial moment and the signal of the stable pixel associated to said unstable pixel at said initial moment according to a following relation:

$$S^*_{unstable}(t) = S_{unstable}(t0) \times (S_{stable}(t)/S_{stable}(t0))$$

t0 being the initial moment and t being time.

2. The method according to claim 1, wherein the amplitude distribution of each pixel n is a histogram $D_n$ centered on a mean value $\mu_n$, the statistical indicator being a standard deviation $s_n$.

3. The method according to claim 2, wherein the classifying of each pixel into a category of pixels is carried out depending on whether a value of a ratio $s_n/\mu_n$ for the pixel is below a predetermined threshold.

4. The method according to claim 2, wherein
   the matrix further comprises a plurality of elementary mesh cells each comprising a predetermined number of the plurality of pixels;
   in each mesh cell, the pixel with the lowest value of the ratio $s_n/\mu_n$ of the pixels included in the mesh cell is classified into the first category of pixels, and the remaining pixels included in the mesh cell are classified into the second category of pixels.

5. The method according to claim 4, wherein the criterion of relative position is membership in one and the same mesh cell.

6. The method of according to claim 2, wherein the criterion of relative position is the smallest distance separating the unstable pixel from the closest stable pixel.

7. A method of controlling a stability of response of a semi-conductor matrix imager comprising a plurality of pixels, the method comprising:
   a first phase of characterizing the stability, the first phase comprising:
   irradiating the pixels of a detector with a gauge radiation that is constant over time for a first predetermined duration;
   storing signals delivered by each pixel at regular time intervals for the first said predetermined duration;
   determining, for each pixel, an amplitude distribution of the signals delivered by each pixel, wherein the amplitude distribution of each pixel is a histogram, including a number of occurrences of signals as a function of amplitude;
   characterizing each distribution with a statistical indicator representative of the dispersion of the distribution, and;
   classifying each pixel, on the basis of the indicator for the pixel, into one of at least two categories of pixels, each category being representative of the stability of the temporal response of the pixels, the first category representing stable pixels, the second category representing unstable pixels;
   a second phase of correcting the stability, the second phase comprising:
   associating each unstable pixel with one of stable pixels according to a predetermined criterion;
   irradiating the pixels with a radiation to be characterized for a second predetermined duration;
   storing signals delivered by each pixel for at least one time interval taken during the said second predetermined duration; and
   correcting the signal generated by each unstable pixel during a given time interval by multiplying the said signal of the said unstable pixel by a ratio between a mean value $M_{stable}(t)$ of a said stable pixel associated to said unstable pixel during a time interval $\Delta t$ by a mean value $M_{unstable}(t)$ of said unstable pixel during the time interval $\Delta t$, wherein each of the mean value $M_{stable}(t)$ and $M_{unstable}(t)$ is an average value computed over the time interval $\Delta t$, wherein $$S^*_{unstable}(t) = S_{unstable}(t) \times M_{stable}(t) / M_{unstable}(t).$$

8. The method according to claim 7, wherein the amplitude distribution of each pixel n is a histogram $D_n$ centred on a mean value $\mu_n$, the statistical indicator being a standard deviation $s_n$.

9. The method according to claim 8, wherein the classifying of each pixel into a category of pixels is carried out depending on whether the value of the ratio $s_n/\mu_n$ is below a predetermined threshold.

10. The method according to claim 8, wherein
the matrix further comprises a plurality of elementary mesh cells each comprising a predetermined number of the plurality of pixels,
wherein, in each mesh cell, the pixel with the lowest value of the ratio $s_n/\mu_n$ of the pixels included in the mesh cell is classified into the first category of pixels, and the remaining the pixels included in the mesh cell are classified into the second category of pixels.

11. The method according to claim 10, wherein the predetermined criterion is membership in one and the same mesh cell.

12. The method according to claim 8, wherein the predetermined criterion is the smallest distance separating the unstable pixel from the closest stable pixel.

* * * * *